United States Patent
Majcher et al.

(10) Patent No.: US 9,982,203 B2
(45) Date of Patent: May 29, 2018

(54) PROCESS FOR THE CONVERSION OF A HEAVY HYDROCARBON FEEDSTOCK INTEGRATING SELECTIVE CASCADE DEASPHALTING WITH RECYCLING OF A DEASPHALTED CUT

(71) Applicant: IFP Energies nouvelles, Rueil-Malmaison (FR)

(72) Inventors: Jerome Majcher, Lyons (FR); Isabelle Merdrignac, Chaponnay (FR); Frederic Feugnet, Lyons (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 42 days.

(21) Appl. No.: 15/100,745

(22) PCT Filed: Nov. 27, 2014

(86) PCT No.: PCT/EP2014/075859
§ 371 (c)(1),
(2) Date: Jun. 1, 2016

(87) PCT Pub. No.: WO2015/082314
PCT Pub. Date: Jun. 11, 2015

(65) Prior Publication Data
US 2016/0304794 A1    Oct. 20, 2016

(30) Foreign Application Priority Data
Dec. 3, 2013   (FR) ..................................... 13/62030

(51) Int. Cl.
*C10G 67/00* (2006.01)
*C10G 67/04* (2006.01)
(Continued)

(52) U.S. Cl.
CPC ....... *C10G 67/0463* (2013.01); *C10G 21/003* (2013.01); *C10G 21/14* (2013.01);
(Continued)

(58) Field of Classification Search
CPC .. C10G 67/0463; C10G 21/003; C10G 45/20; C10G 47/00; C10G 49/04; C10G 49/16;
(Continued)

(56) References Cited

U.S. PATENT DOCUMENTS 3,278,415 A    10/1966 Doberenz et al.
4,940,529 A    7/1990 Beaton et al.
(Continued)

FOREIGN PATENT DOCUMENTS

FR    2964388 A1    3/2012

OTHER PUBLICATIONS

International Search Report dated Jan. 28, 2015, issued in corresponding PCT/EP2014/075859, 3 pages.

*Primary Examiner* — Randy Boyer
*Assistant Examiner* — Juan C Valencia
(74) *Attorney, Agent, or Firm* — Millen White Zelano and Branigan, PC; John Sopp (57) ABSTRACT

Process for converting a heavy hydrocarbon feedstock with initial boiling point of at least 300° C. comprising: a) hydroconverting at least part of said feedstock; b) separating the effluent from stage a) to obtain light and heavy liquid fractions; c) at least two stages of deasphalting in series at least part of the heavy liquid fraction originating from stage b), allowing to separate at least one fraction of asphalt, at least one fraction of heavy deasphalted oil (heavy DAO) and at least one fraction of light deasphalted oil (light DAO), at least one deasphalting stage being carried out using a mixture of at least one polar solvent and at least one apolar solvent, said deasphalting stages being under subcritical
(Continued)

conditions of the mixture of solvents; d) recycling at least part of said heavy deasphalted oil cut from stage c) upstream of hydroconverting a) and/or of the inlet of separating b).

23 Claims, 3 Drawing Sheets (51) Int. Cl.
*C10G 45/08* (2006.01)
*C10G 45/20* (2006.01)
*C10G 47/00* (2006.01)
*C10G 49/04* (2006.01)
*C10G 49/16* (2006.01)
*C10G 53/06* (2006.01)
*C10G 67/14* (2006.01)
*C10G 21/00* (2006.01)
*C10G 21/14* (2006.01)

(52) U.S. Cl.
CPC ............. *C10G 45/08* (2013.01); *C10G 45/20* (2013.01); *C10G 47/00* (2013.01); *C10G 49/04* (2013.01); *C10G 49/16* (2013.01); *C10G 53/06* (2013.01); *C10G 67/00* (2013.01); *C10G 67/14* (2013.01); *C10G 2300/1014* (2013.01); *C10G 2300/1074* (2013.01); *C10G 2300/1077* (2013.01); *C10G 2300/202* (2013.01); *C10G 2300/205* (2013.01); *C10G 2300/206* (2013.01); *Y02P 30/20* (2015.11)

(58) Field of Classification Search
CPC ........ C10G 53/06; C10G 21/14; C10G 45/08; C10G 67/14; C10G 2300/206; C10G 2300/1014; C10G 2300/1074; Y02P 30/20
See application file for complete search history.

(56) References Cited

U.S. PATENT DOCUMENTS

| 5,258,117 | A | * | 11/1993 | Kolstad | ................. | C10G 11/18 |
| | | | | | | 208/221 |
| 2012/0061292 | A1 | | 3/2012 | Sanchez et al. | | |
| 2015/0021234 | A1 | * | 1/2015 | Merdrignac | ........... | C10G 69/04 |
| | | | | | | 208/86 |
| 2015/0337223 | A1 | * | 11/2015 | Merdrignac | ....... | C10G 67/0463 |
| | | | | | | 208/86 |

* cited by examiner

PROCESS FOR THE CONVERSION OF A HEAVY HYDROCARBON FEEDSTOCK INTEGRATING SELECTIVE CASCADE DEASPHALTING WITH RECYCLING OF A DEASPHALTED CUT

FIELD OF THE INVENTION

The present invention relates to a new process for the conversion of a heavy hydrocarbon feedstock, in particular obtained from atmospheric distillation or vacuum distillation of crude oil.

It is known that the performances of the processes for upcycling and conversion generally come up against limitations that are mainly connected with the presence of so-called refractory molecular structures. In fact, these molecular structures (heteroelements, polyaromatic molecules and polar molecules present in resins and asphaltenes) are responsible for the formation of sediments causing clogging of equipment downstream of the units for hydroconversion of heavy feedstocks and consequently frequent stoppages during operation of this equipment. Moreover, in order to reduce the frequency of stoppages, the units for hydroconversion of heavy feedstocks are often operated under milder conditions, consequently limiting the degree of conversion.

One aim of the present invention is therefore to increase the level of conversion of the feedstock to be upcycled.

Another aim of the invention is to minimize the formation of such sediments in the equipment downstream of the hydroconversion units.

One of the solutions known in the state of the art consists of linking a deasphalting unit (called standard or conventional SDA in the remainder of the text) with a hydroconversion unit.

The principle of deasphalting is based on separation, by precipitation, of a petroleum residue into two phases: i) a phase referred to as "deasphalted oil", also referred to as "oil matrix" or "oil phase" or DAO (De-Asphalted Oil); and ii) a phase referred to as "asphalt" or sometimes "pitch", containing, among other things, the refractory molecular structures. The asphalt, due to its mediocre quality, is a product detrimental to refining systems, that should be minimized.

Patent applications US 2012/0061292 A1 and US 2012/0061293 A1 describe a succession of ebullating-bed and conventional deasphalting processes with recycling of the deasphalted oil DAO upstream of the ebullating bed.

These patent applications describe conventional deasphalting which, due to its principle, suffers from limitations, in particular a limitation on yield of deasphalted oil DAO, which increases with the molecular weight of the solvent (up to C6/C7 solvent) and then levels off at a threshold specific to each feedstock and each solvent. Moreover, this conventional deasphalting suffers from very low selectivity, with the result that molecular structures that are still upcyclable are extracted to the fraction of asphalt.

The applicant's research led to the development of a novel process for the conversion of a heavy hydrocarbon feedstock making it possible to overcome the aforementioned drawbacks, by integrating at least two stages of deasphalting in series, making it possible to separate at least one fraction of asphalt, at least one fraction of heavy deasphalted oil, referred to as heavy DAO, and at least one fraction of light deasphalted oil, referred to as light DAO. It was found that the implementation of the process according to the invention made it possible to produce a heavy deasphalted oil DAO having a more pronounced aromatic nature (i.e. comprising aromatic structures) than in the case of conventional deasphalting, and that the recycling of said heavy deasphalted oil upstream of the stage of hydroconversion allowed better stabilization of the medium treated in the ebullating bed by solubilization and/or peptization and/or dispersion of the molecular structures favourable to formation of the sediments and thus attainment of higher overall conversion levels of the initial feedstock.

Purpose of the Invention

The present invention relates to a process for the conversion of a heavy hydrocarbon feedstock having an initial boiling point of at least 300° C. comprising the following stages:

a) a stage of hydroconversion of at least a part of said feedstock in the presence of hydrogen in at least one three-phase reactor, said reactor containing at least one hydroconversion catalyst and operating as an ebullating bed, with ascending flow of liquid and of gas and comprising at least one means for drawing off said catalyst from said reactor and at least one means for supplying fresh catalyst to said reactor, under conditions making it possible to obtain a liquid feedstock with a reduced content of Conradson carbon, metals, sulphur and nitrogen, b) a stage of separation of the effluent originating from stage a) in order to obtain a light liquid fraction with a boiling point lower than 300° C. and a heavy liquid fraction with a boiling point greater than 300° C., c) at least two stages of deasphalting in series on at least a part of the heavy liquid fraction originating from stage b), making it possible to separate at least one fraction of asphalt, at least one fraction of heavy deasphalted oil, referred to as heavy DAO, and at least one fraction of light deasphalted oil, referred to as light DAO, at least one of said stages of deasphalting being carried out by means of a mixture of at least one polar solvent and at least one apolar solvent, the proportions of said polar solvent and said apolar solvent in the mixture of solvents being adjusted depending on the properties of the feedstock treated and depending on the desired yield of asphalt and/or desired quality of the deasphalted oil, said stages of deasphalting being implemented under the subcritical conditions of the mixture of solvents used, d) a stage of recycling at least a part of said cut of heavy deasphalted oil DAO originating from stage c) upstream of the stage a) of hydroconversion and/or to the inlet of the stage b) of separation.

In a variant of the process, stage c) is implemented on at least a part of the heavy liquid fraction with a boiling point greater than 300° C. previously subjected to a stage of steam stripping and/or hydrogen stripping or to a stage of vacuum fractionation.

Advantageously according to the invention, the stage a) of hydroconversion is carried out under an absolute pressure comprised between 2 and 35 MPa, at a temperature comprised between 300 and 550° C., at a hourly space velocity (HSV) comprised between 0.1 $h^{-1}$ and 10 $h^{-1}$ and with a quantity of hydrogen mixed with the feedstock comprised between 50 and 5000 normal cubic meters ($Nm^3$) per cubic meter ($m^3$) of liquid feedstock.

Advantageously according to the invention, the hydroconversion catalyst of stage a) is a catalyst comprising an alumina support and at least one group VIII metal selected from nickel and cobalt, said group VIII element being used in combination with at least one group VIB metal selected from molybdenum and tungsten.

Advantageously according to the invention, the polar solvent used in the stage c) of deasphalting is selected from the pure aromatic or naphthene-aromatic solvents, the polar solvents comprising heteroelements, or a mixture thereof or cuts rich in aromatics such as the cuts originating from FCC (Fluid Catalytic Cracking), cuts derived from coal, biomass or biomass/coal mixture.

Advantageously according to the invention, the apolar solvent used in the stage c) of deasphalting comprises a solvent made up of a saturated hydrocarbon comprising a number of carbon atoms greater than or equal to 2, preferably comprised between 2 and 9.

Advantageously according to the invention, stage c) is implemented with a ratio of the volume of the mixture of polar and apolar solvents to the weight of the feedstock comprised between 1/1 and 10/1 expressed as liters per kilogram.

Advantageously according to the invention, at least a part of the cut of heavy deasphalted oil DAO not recycled upstream of the stage a) of hydroconversion and/or to the inlet of the stage b) of separation is sent, preferably mixed with at least a part of the light liquid fraction originating from stage b) and/or at least a part of the light deasphalted oil DAO originating from stage c), to post-treatment units.

Advantageously according to the invention, the feedstock is crude oil or a feedstock originating from atmospheric distillation or vacuum distillation of crude oil, or a residual fraction originating from the direct liquefaction of coal or a vacuum distillate or a residual fraction originating from the direct liquefaction of lignocellulosic biomass alone or in a mixture with coal and/or a fraction of residual petroleum.

The process according to the invention has the advantage of producing an improved stabilizing effect in the stage of hydroconversion due to the implementation of a stage of deasphalting in at least two stages and hence to the isolation and recycling of a stabilizing cut (heavy DAO) with a higher concentration of aromatic species (resins). An increased stabilizing effect make it possible to make the operating conditions more severe and therefore improve the conversion in the stage of hydroconversion, the limiting factor for conversion being sedimentation downstream of the hydroconversion units.

DETAILED DESCRIPTION OF THE INVENTION

The Feedstock

The heavy hydrocarbon feedstock according to the process of the invention is advantageously a heavy feedstock originating from the atmospheric distillation or vacuum distillation of crude oil, typically with boiling points of at least 300° C., preferably greater than 450° C., and containing impurities, in particular sulphur, nitrogen and metals. The feedstock can be crude oil.

The feedstock according to the process of the invention can be of petroleum origin of the atmospheric residue or vacuum residue type originating from so-called conventional (API degree >20°), heavy (API degree comprised between 10 and 20°) or extra heavy crude (API degree)<10°.

The feedstock can be of different geographic and geochemical origins (type I, II, IIS or III), and also of different degrees of maturity and biodegradation.

Said feedstock can also be a residual fraction originating from the direct liquefaction of coal (atmospheric residue or vacuum residue originating for example from the H-Coal™ process) or an H-Coal™ vacuum distillate or a residual fraction originating from the direct liquefaction of lignocellulosic biomass alone or in a mixture with coal and/or a fraction of residual petroleum. This type of feedstock is generally rich in impurities with levels of metals greater than 20 ppm, preferably greater than 100 ppm. The sulphur content is greater than 0.5%, preferably greater than 1%, and preferably greater than 2% by weight. The level of C7 asphaltenes is advantageously greater than 1%, preferably the level of C7 asphaltenes is comprised between 1 and 40% and more preferably between 2 and 30% by weight. The C7 asphaltenes are compounds known to inhibit the conversion of residual cuts, both through their ability to form heavy hydrocarbon residues, commonly called coke, and through their tendency to produce sediments that greatly limit the operability of the hydrotreating and hydroconversion units. The Conradson carbon content is greater than 5% by weight, or even 35% by weight. The Conradson carbon content is defined in ASTM standard D 482 and represents, for a person skilled in the art, a well-known evaluation of the quantity of carbon residues produced after combustion under standard conditions of temperature and pressure.

Stage a) Hydroconversion of the Feedstock

According to stage a) of the process according to the invention, the feedstock is subjected to a stage a) of hydroconversion in the presence of hydrogen in at least one three-phase reactor, said reactor containing at least one hydroconversion catalyst and operating as an ebullating bed, with ascending flow of liquid and of gas and comprising at least one means for drawing off said catalyst from said reactor and at least one means for supplying fresh catalyst to said reactor, under conditions making it possible to obtain a liquid feedstock with a reduced content of Conradson carbon, metals, sulphur and nitrogen.

According to the process of the invention, at least a part of the cut of heavy deasphalted oil DAO originating from stage c) is recycled upstream of stage a) of hydroconversion, mixed with said feedstock.

In the case where the feedstock treated in the process according to the invention is a crude oil, the crude oil feedstock is sent directly to said stage a) of hydroconversion, preferably after simple topping of its lightest fraction, the end point of which is generally comprised between 50 and 250° C., and preferably between 100 and 200° C.

In the case where the feedstock treated in the process according to the invention is the fraction originating from the atmospheric distillation of a crude oil, or a fraction called atmospheric residue (AR), said process advantageously comprises a stage of atmospheric distillation prior to the stage a) of hydroconversion.

In the case where the feedstock treated in the process according to the invention is the fraction originating from the atmospheric and vacuum distillation of a crude oil, or a fraction called vacuum residue (VR), said process advantageously comprises a stage of atmospheric distillation followed by a stage of vacuum distillation prior to the stage a) of hydroconversion.

The stage a) of hydroconversion of the feedstock according to the invention is generally carried out under standard conditions of ebullating-bed hydroconversion of a fraction of liquid hydrocarbon. It is usually carried out under an absolute pressure comprised between 2 and 35 MPa, preferably between 5 and 25 MPa and more preferably between 6 and 20 MPa, at a temperature comprised between 300 and 550° C. and preferably comprised between 350 and 500° C. The hourly space velocity (HSV) and partial pressure of hydrogen are important factors that are selected as a function of the characteristics of the product to be treated and the desired conversion. Preferably, the HSV is comprised between 0.1 $h^{-1}$ and 10 $h^{-1}$ and preferably between 0.15 $h^{-1}$ and 5 $h^{-1}$. The quantity of hydrogen mixed with the feedstock is preferably comprised between 50 and 5000 normal cubic meters ($Nm^3$) per cubic meter ($m^3$) of liquid feedstock and more preferably between 100 and 2000 $Nm^3/m^3$, and very preferably between 200 and 1000 $Nm^3/m^3$.

The hydroconversion catalyst used in stage a) of the process according to the invention is advantageously a granular catalyst with size of the order of 1 mm. The catalyst is most often in the form of extrudates or beads. Typically, the catalyst comprises a support, the pore distribution of which is suitable for treatment of the feedstock, preferably amorphous and very preferably of alumina, a silica-alumina support also being conceivable in certain cases and at least one group VIII metal selected from nickel and cobalt and preferably nickel, said group VIII element preferably being used in combination with at least one group VIB metal selected from molybdenum and tungsten, and preferably the group VIB metal is molybdenum.

Preferably, the hydroconversion catalyst comprises nickel as group VIII element and molybdenum as group VIB element. The nickel content is advantageously comprised between 0.5 and 15% expressed as weight of nickel oxide (NiO) and preferably between 1 and 10% by weight and the molybdenum content is advantageously comprised between 1 and 40% expressed as weight of molybdenum trioxide ($MoO_3$), and preferably between 4 and 20% by weight. Said catalyst can also advantageously contain phosphorus, the content of phosphorus oxide preferably being less than 20% by weight and preferably less than 10% by weight.

Advantageously, a catalytic precursor is injected either with the feedstock of the ebullating-bed hydroconversion unit, or at the inter-stage separator between two reactors, or at the inlet of one of the other reactors.

The spent hydroconversion catalyst can, according to the process according to the invention, be partly replaced with fresh catalyst by drawing off, preferably at the bottom of the reactor and by introduction, either at the top or at the bottom of the reactor, of fresh or regenerated or rejuvenated catalyst, preferably at regular intervals and more preferably in bursts or almost continuously. The rate of replacement of spent hydroconversion catalyst with fresh catalyst is advantageously comprised between 0.01 kilogram and 10 kilograms per cubic meter of feedstock treated, and preferably between 0.3 kilogram and 3 kilograms per cubic meter of feedstock treated. This drawing off and replacement are carried out using devices advantageously allowing continuous operation of this stage of hydroconversion.

It is also advantageously possible to send the spent catalyst drawn off from the reactor to a regeneration zone in which the carbon and the sulphur that it contains are removed and then to return this regenerated catalyst to the stage a) of hydroconversion. It is also advantageously possible to send the spent catalyst drawn off from the reactor into a rejuvenation zone in which the major part of the deposited metals is removed, before sending the spent and rejuvenated catalyst into a regeneration zone in which the carbon and the sulphur that it contains are removed and then to return this regenerated catalyst to the stage a) of hydroconversion.

Stage a) of the process according to the invention is advantageously implemented under the conditions of the H-Oil™ process as described for example in U.S. Pat. No. 4,521,295 or U.S. Pat. No. 4,495,060 or U.S. Pat. No. 4,457,831 or U.S. Pat. No. 4,354,852 or in the article Aiche, Mar. 19-23, 1995, HOUSTON, Tex., paper number 46d, Second generation ebullated bed technology.

The hydroconversion catalyst used in the stage a) of hydroconversion advantageously allows both demetallization and desulphurization, under conditions making it possible to obtain a liquid feedstock with a reduced content of metals, Conradson carbon and sulphur and making it possible to obtain a high level of conversion to light products, i.e. in particular to gasoline and gas oil fuel fractions.

Stage a) is advantageously implemented in one or more three-phase hydroconversion reactors, preferably one or more three-phase hydroconversion reactors with intermediate settler drums. Each reactor advantageously comprises a recirculating pump for maintaining the catalyst under ebullating bed conditions by continuous recycling of at least a part of a liquid fraction advantageously drawn off from the top of the reactor and reinjected at the bottom of the reactor.

Stage b) Separation of the Effluent Originating from Stage a)

The effluent originating from the stage a) of hydroconversion is then subjected, according to stage b) of the process according to the invention, to a stage of separation in order to obtain a light liquid fraction with a boiling point lower than 300° C., preferably lower than 350° C. and more preferably lower than 375° C. and a heavy liquid fraction with a boiling point greater than 300° C., preferably greater than 350° C. and more preferably greater than 375° C. This separation comprises any separating means known to a person skilled in the art. Preferably, this separation is carried out by one or more flash drums in series, and preferably by a sequence of two successive flash drums.

In the stage b) of separation, the conditions are selected so that the cut point is 300° C., preferably 350° C. and more preferably 375° C., so as to obtain two liquid fractions, a so-called light fraction, and a so-called heavy fraction.

The light fraction obtained directly at the outlet of stage b) of separation is then advantageously separated from the light gases ($H_2$, $H_2S$, $NH_3$ and $C_1$-$C_4$), in order to obtain the light liquid fraction with a boiling point lower than 300° C., by any separating means known to a person skilled in the art, for example by passing through a flash drum, so as to recover gaseous hydrogen, which is advantageously recycled after purification to the stage a) of hydroconversion. Said light liquid fraction, advantageously separated from said light gases and with a boiling point lower than 300° C., preferably lower than 350° C. and more preferably lower than 375° C. contains the dissolved light gases (C5+), a fraction with a boiling point lower than 150° C. corresponding to the naphthas, a fraction boiling between 150 and 250° C. corresponding to the kerosene fraction and at least a part of the gas oil fraction boiling between 250 and 375° C. Said light liquid fraction is advantageously sent to a stage of separation, preferably in a distillation column in order to separate said naphtha, kerosene and gas oil fractions from it.

The heavy liquid fraction with a boiling point greater than 300° C., preferably greater than 350° C. and more preferably greater than 375° C. contains at least a part of the gas oil fraction boiling between 250 and 375° C., a fraction boiling between 375 and 520° C. or even 540° C. called vacuum distillate, and a fraction with a boiling point greater than 520° C. or even 540° C., called unconverted vacuum residue. The heavy liquid fraction therefore comprises at least a part of the middle distillates and preferably at least a part of the gas oil fraction with a boiling point comprised between 250 and 375° C.

In a variant of the process according to the invention, the heavy liquid fraction is advantageously subjected to a stage of steam stripping and/or hydrogen stripping or a stage of vacuum fractionation before being sent to stage c) of deasphalting according to the invention. This stage makes it possible to remove, at least partly, the vacuum distillate fraction (9) or VGO (vacuum gas oil) contained in the heavy liquid fraction. In the case where the stage of vacuum fractionation is carried out, the latter is preferably carried out in a vacuum distillation column making it possible to separate a heavy liquid fraction with a boiling point greater than 400° C.

Stage c) Selective Deasphaltinq of the Heavy Liquid Fraction Originating from Stage b)

According to the process of the invention, at least a part of the heavy liquid fraction with a boiling point greater than 300° C., preferably greater than 350° C. and more preferably greater than 375° C. or even greater than 400° C. originating from stage b) is subjected to at least two stages of deasphalting in series, making it possible to separate at least one fraction of asphalt, at least one fraction of heavy deasphalted oil, referred to as heavy DAO and at least one fraction of light deasphalted oil, referred to as light DAO, at least one of said stages of deasphalting being carried out by means of a mixture of at least one polar solvent and at least one apolar solvent, said stages of deasphalting being implemented under the subcritical conditions of the mixture of solvents used.

The proportions of said polar solvent and of said apolar solvent in the mixture of solvents are adjusted depending on the properties of the feedstock treated and depending on the desired yield of asphalt and/or desired quality of the DAO.

In a variant, said stage c) is implemented on at least a part of the heavy fraction previously subjected to a stage of steam stripping and/or hydrogen stripping or to a stage of vacuum fractionation.

In the remainder of the text and in the above, the expression "mixture of solvents according to the invention" is understood to mean a mixture of at least one polar solvent and at least one apolar solvent according to the invention.

The selective deasphalting implemented in stage c) makes it possible to go further in maintaining the solubilization in the oil matrix of all or part of the polar structures of the heavy resins and asphaltenes which are the main constituents of the asphalt phase in the case of conventional deasphalting. The invention thus makes it possible to select which type of polar structures remain solubilized in the oil matrix. Consequently, the selective deasphalting implemented in the invention makes it possible to selectively extract only a part of this asphalt from the feedstock, i.e. the structures that are the most polar and the most refractory in the conversion and refining processes. Due to specific deasphalting conditions, the process according to the invention allows greater flexibility in the treatment of the feedstocks depending on their nature but also depending on the desired quality and/or yield of heavy deasphalted oil DAO and/or light deasphalted oil DAO. Moreover, the deasphalting conditions according to the invention make it possible to overcome the limitations of the yield of deasphalted oil DAO imposed by the use of paraffinic solvents.

The asphalt extracted during the deasphalting according to the invention corresponds to the final asphalt that is essentially composed of polyaromatic and/or heteroatomic molecular structures that are refractory in refining. This results in an improved yield of upcyclable deasphalted oil.

Stage c) of selective deasphalting can be carried out in an extraction column, or in a mixer-settler. Preferably, the mixture of solvents according to the invention is fed into an extraction column or a mixer-settler, at two different levels. Preferably, the mixture of solvents according to the invention is introduced into an extraction column or a mixer-settler, at a single introduction level. This stage is carried out by liquid/liquid extraction in at least two stages of deasphalting in series.

According to the invention, the liquid/liquid extraction in the stages of deasphalting is implemented under the subcritical conditions for said mixture of solvents, i.e. at a temperature lower than the critical temperature of the mixture of solvents. When a single solvent, preferably an apolar solvent, is utilized, the stage of deasphalting is implemented under the subcritical conditions for said solvent, i.e. at a temperature lower than the critical temperature of said solvent. The extraction temperature is advantageously comprised between 50 and 350° C., preferably between 90 and 320° C., more preferably between 100 and 310° C., even more preferably between 120 and 310° C., even more preferably between 150 and 310° C., and the pressure is advantageously comprised between 0.1 and 6 MPa, preferably between 2 and 6 MPa.

The ratio of the volume of the mixture of solvents according to the invention (volume of polar solvent+volume of apolar solvent) to the mass of feedstock is generally comprised between 1/1 and 10/1, and preferably between 2/1 and 8/1, expressed as liters per kilogram.

Advantageously according to the process of the invention, the boiling point of the polar solvent in the mixture of solvents according to the invention is greater than the boiling point of the apolar solvent.

The polar solvent used can be selected from the pure aromatic or naphthene-aromatic solvents, the polar solvents comprising heteroelements, or a mixture thereof. The aromatic solvent is advantageously selected from the monoaromatic hydrocarbons, preferably benzene, toluene or the xylenes, alone or in a mixture; the diaromatics or polyaromatics; the naphthene hydrocarbons-aromatic hydrocarbons such as tetralin or indan; heteroatomic aromatic hydrocarbons (oxygen-containing, nitrogen-containing, sulphur-containing) or any other family of compounds having a more polar nature than the saturated hydrocarbons such as for example dimethylsulphoxide (DMSO), dimethylformamide (DMF), tetrahydrofuran (THF). The polar solvent used in the process according to the invention can also be a cut rich in aromatics. The cuts rich in aromatics according to the invention can be for example cuts originating from FCC (Fluid Catalytic Cracking) such as heavy gasoline or LCO (light cycle oil). The cuts derived from coal, from biomass or from biomass/coal mixture, optionally with a residual petroleum feedstock following thermochemical conversion with or without hydrogen, with or without catalyst may also be mentioned. It is also possible to use light petroleum cuts of the naphtha type, preferably light petroleum cuts of the straight-run naphtha type. Preferably, the polar solvent used is a monoaromatic hydrocarbon, pure or mixed with another aromatic hydrocarbon.

The apolar solvent used in the process according to the invention is preferably a solvent made up of saturated hydrocarbon(s) comprising a number of carbons greater than or equal to 2, preferably comprised between 2 and 9. These solvents are used pure or in a mixture (for example: mixture of alkanes and/or of cycloalkanes or of light petroleum cuts of the naphtha type, preferably light petroleum cuts of the straight-run naphtha type).

The selection of the conditions of temperature and pressure of the extraction according to the invention combined with the selection of the nature of the solvents and with the selection of the combination of apolar and polar solvents in at least one of the stages of deasphalting make it possible to adjust the performance of the process according to the invention in order to access in particular a range of selectivity previously inaccessible with conventional deasphalting.

In the case of the present invention, the optimization of these key points of adjustment (nature of the solvents, relative proportions of the polar and apolar solvents) makes it possible to separate the feedstock into three fractions: an fraction of asphalt referred to as final, enriched with impurities and compounds resistant to upcycling, a heavy deasphalted oil phase referred to as heavy DAO enriched with structures of the least polar resins and asphaltenes that are not refractory, and a light deasphalted oil phase referred to as light DAO depleted of resins and asphaltenes, and generally of impurities (metals, heteroatoms). Moreover, this makes it possible to increase the aromatic nature of the heavy deasphalted oil phase referred to as heavy DAO, recycling of which, upstream of the stage of hydroconversion, allows better stabilization of the medium treated under ebullating bed conditions by a solubilizing and/or peptizing and/or dispersing effect on the molecular structures that are favourable to the formation of sediments. It is therefore possible to impose more severe operating conditions in the stage of hydroconversion, and thus attain higher conversion levels of the residual fraction.

Advantageously, the proportion of polar solvent in the mixture of polar solvent and apolar solvent is comprised between 0.1 and 99.9%, preferably between 0.1 and 95%, preferably between 1 and 95%, more preferably between 1 and 90%, even more preferably between 1 and 85%, and very preferably between 1 and 80%.

The proportion of polar solvent in the mixture of polar and apolar solvent depends on the nature of the heavy liquid fraction, as the molecular structures making up the heavy liquid fraction vary from one heavy liquid fraction to another.

The heavy liquid fractions do not all have an identical refractory nature. The level of asphalt to be extracted is not necessarily the same, depending on the nature of the heavy liquid fraction.

The nature of the heavy liquid fraction also depends on the origin of the feedstock according to the invention, whether of petroleum origin, originating from coal or of biomass type.

Stage c) of selective deasphalting has the advantage of allowing a considerable improvement in the total yield of deasphalted oil DAO over a whole range previously unexplored by conventional deasphalting. For a given heavy liquid fraction the obtained total yield of heavy deasphalted oil DAO and light deasphalted oil DAO of which has levelled off at 75% (extraction with normal heptane), selective deasphalting makes it possible, by adjusting the proportion of polar solvent and of apolar solvent, to cover the range 75-99.9% of yield of heavy and light deasphalted oil DAO.

The total yield of heavy deasphalted oil DAO and light deasphalted oil DAO is advantageously comprised between 50 and 99.9%, preferably between 75 and 99.9%, more preferably between 80 and 99.9%.

Another advantage according to the invention is that it allows, due to the selective deasphalting according to stage c), reduction of the fraction of asphalt, the yield of which can be far lower relative to the use of conventional deasphalting, for a given feedstock. According to the process of the invention, this yield is reduced to the range 0.1 to 30% depending on the apolar solvent/polar solvent ratio. It is reduced more as the proportion of polar solvent in the mixture is increased. Consequently, the range of extraction of the asphalt with a yield in the range 0.1-50%, particularly 0.1-30%, preferably 0.1-25%, more preferably 0.1-15% is now covered. It is a function of the desired selectivity for a given feedstock as well as of the nature of the feedstock. This is an interesting point, knowing that the very low cost of upcycling of asphalt (a detrimental fraction) always constitutes a real limitation to systems including this type of process.

The more aromatic nature of the heavy deasphalted oil referred to as heavy DAO originating from stage c) makes it possible to use it for its properties of stabilization of the C7 asphaltenes contained in the feedstock, in the zones with risk of sedimentation such as the ebullating bed, the separating zone between ebullating bed and the stage c) of deasphalting. The heavy deasphalted oil referred to as heavy DAO can be recycled to the inlet of the first reactor of the ebullating-bed unit, but also directly to the inlet of one of the other reactors with operating conditions that are unrelated between the different reactors.

According to the process of the invention, the nature of the solvent and/or the proportion and/or the intrinsic polarity of the polar solvent in the mixture of solvents can be adjusted depending on whether it is desired to extract the asphalt in the first stage of deasphalting or in the second stage of deasphalting.

In a first embodiment, stage c) of the process according to the invention is implemented in a configuration referred to as having decreasing polarity, i.e. the polarity of the mixture of solvents used during the first stage of deasphalting is higher than that of the solvent or mixture of solvents used during the second stage of deasphalting. This configuration makes it possible to extract, during the first stage of deasphalting, a fraction of asphalt phase referred to as final and a fraction of complete deasphalted oil referred to as complete DAO; the two fractions referred to as heavy deasphalted oil and light deasphalted oil being extracted from the complete DAO during the second stage of deasphalting.

In a second embodiment, stage c) of the process according to the invention is implemented in a configuration referred to as having increasing polarity, i.e. the polarity of the solvent or mixture of solvents used during the first stage of deasphalting is lower than that of the mixture of solvents used during the second stage of deasphalting. In such a configuration, during the first stage a fraction of deasphalted oil referred to as light and an effluent comprising an oil phase and an asphalt phase are extracted; said effluent being subjected to a second stage of deasphalting in order to extract a fraction of asphalt phase and a fraction of heavy deasphalted oil phase referred to as heavy DAO.

First Embodiment

According to this embodiment, the process according to the invention comprises at least:

c1) a first stage of deasphalting comprising bringing the feedstock into contact with a mixture of at least one polar solvent and at least one apolar solvent, the proportions of said polar solvent and said apolar solvent being adjusted so as to obtain at least one fraction of asphalt phase and one fraction of complete deasphalted oil phase referred to as complete DAO; and c2) a second stage of deasphalting comprising bringing the complete deasphalted oil phase referred to as complete DAO originating from stage c1) into contact with either an apolar solvent or a mixture of at least one polar solvent and at least one apolar solvent, the proportions of said polar solvent and said apolar solvent in the mixture being adjusted so as to obtain at least one fraction of light deasphalted oil phase referred to as light DAO and one fraction of heavy deasphalted oil phase referred to as heavy DAO, said stages of deasphalting being implemented under the subcritical conditions of the solvent or mixture of solvents used.

The first stage of deasphalting thus makes it possible to extract selectively, and in an optimal manner suited to each heavy liquid fraction, an fraction of asphalt referred to as final, enriched with impurities and compounds resistant to upcycling, whilst leaving solubilized in the complete deasphalted oil matrix referred to as complete DAO, all or part of the polar structures of the least polar heavy resins and asphaltenes, which for their part are not resistant with respect to the downstream refining stages. Thus, depending on the proportion of apolar/polar solvent, the yield of DAO can be significantly improved and the yield of asphalt therefore minimized. This is a point of interest knowing that the upcycling of the asphalt (detrimental fraction) always constitutes a real limitation to systems including this type of process.

The complete deasphalted oil DAO originating from stage c1) with, at least in part, the mixture of solvents according to the invention is preferably subjected to at least one stage of separation in which the complete deasphalted oil referred to as complete DAO is separated from the mixture of solvents according to the invention or at least one stage of separation in which the complete deasphalted oil referred to as complete DAO is separated from the apolar solvent only.

In a variant of the process, the complete deasphalted oil referred to as complete DAO originating from stage c1) with, at least in part, the mixture of solvents according to the invention is subjected to at least two successive stages of separation making it possible to separate the solvents individually in each stage. Thus, for example, in a first stage of separation the apolar solvent is separated from the mixture of complete deasphalted oil referred to as complete DAO and polar solvent; and in a second stage of separation the polar solvent is separated from the complete deasphalted oil referred to as complete DAO.

The stages of separation are carried out under supercritical or subcritical conditions.

At the end of the stage of separation, the complete deasphalted oil referred to as complete DAO separated from the solvents is advantageously sent to at least one stripping column before being sent to the second stage (stage c2) of deasphalting.

The mixture of polar and apolar solvents or the individually separated solvents are advantageously recycled. In a variant of the process, only the apolar solvent is recycled into its respective makeup tank. When the recycled solvents are in a mixture, the apolar/polar proportion is verified on-line and adjusted as needed via makeup tanks individually containing the polar and apolar solvents. When the solvents are separated individually, said solvents are recycled individually into said respective makeup tanks.

The separated asphalt phase from the first stage of deasphalting is preferably in the liquid state and is generally diluted at least in part with a portion of the mixture of solvents according to the invention, the quantity of which can range up to 200%, preferably between 30 and 80% of the volume of asphalt drawn off. The asphalt extracted with, at least in part, the mixture of polar and apolar solvents at the end of the stage of extraction can be mixed with at least one fluxing agent so as to be drawn off more easily. The fluxing agent used can be any solvent or mixture of solvents that can solubilize or disperse the asphalt. The fluxing agent can be a polar solvent selected from the monoaromatic hydrocarbons, preferably benzene, toluene or xylene; the diaromatics or polyaromatics; the naphthene-hydrocarbons-aromatic hydrocarbons such as tetralin or indan; the heteroatomic aromatic hydrocarbons; the polar solvents with molecular weight corresponding to boiling points comprised for example between 200° C. and 600° C. such as an LCO (light cycle oil from FCC), an HCO (heavy cycle oil from FCC), FCC slurry, HCGO (heavy coker gas-oil), or an aromatic extract or an extra-aromatic cut extracted from an oil chain, the VGO cuts originating from conversion of residual fractions and/or of coal and/or of biomass. The ratio of volume of fluxing agent to the mass of the asphalt is determined so that the mixture can be drawn off easily.

The second stage of deasphalting can be implemented on at least a part of the complete deasphalted oil referred to as complete DAO originating from the first stage of deasphalting in the presence of a mixture of at least one polar solvent and at least one apolar solvent under the subcritical conditions for the mixture of solvents used. The second stage of deasphalting can also be implemented on at least a part of the complete deasphalted oil referred to as complete DAO originating from the first stage of deasphalting in the presence of an apolar solvent under the subcritical conditions for the solvent used. The polarity of said solvent or mixture of solvents is preferably lower than that of the mixture of solvents used in the first stage of deasphalting. This extraction is carried out so as to obtain a precipitated heavy deasphalted oil phase referred to as heavy DAO (having a highly aromatic nature) predominantly comprising the family of the least polar resins and asphaltenes, at least a part of which is sent upstream of the stage a) of hydroconversion and/or to the inlet of the stage b) of separation and a light deasphalted oil phase referred to as light DAO predominantly comprising the family of saturated hydrocarbons and the family of aromatic hydrocarbons.

At least a part of the fraction of light deasphalted oil referred to as light DAO is advantageously sent to the post-treatment units such as a unit for hydrotreating and/or hydrocracking, or for catalytic cracking.

Second Embodiment

In a second embodiment, the process according to the invention comprises at least:

c'1) a first stage of deasphalting comprising bringing the heavy liquid fraction into contact with either an apolar solvent, or a mixture of at least one polar solvent and at least one apolar solvent, the proportions of said polar solvent and said apolar solvent in the mixture being adjusted so as to obtain at least one fraction of light deasphalted oil phase referred to as light DAO and an effluent comprising an oil phase and an asphalt phase; and c'2) a second stage of deasphalting comprising bringing the effluent originating from stage c'1) into contact with a mixture of at least one polar solvent and at least one apolar solvent, the proportions of said polar solvent and said apolar solvent being adjusted so as to obtain at least one fraction of asphalt phase and a fraction of heavy deasphalted oil phase referred to as heavy DAO, said stages of deasphalting being implemented under the subcritical conditions of the solvent or mixture of solvents used.

In the present embodiment, the order of extraction of the categories of products is reversed: the polarity of the solvent or of the mixture of solvents used in the first stage of deasphalting is lower than that of the mixture of solvents used in the second stage of deasphalting.

The first stage of deasphalting thus makes it possible to selectively extract from the heavy liquid fraction, a fraction of light deasphalted oil referred to as light DAO and an effluent comprising an oil phase and an asphalt phase. The first stage of deasphalting (stage c'1) can be implemented both on an apolar solvent and on a mixture of solvents according to the invention. The nature, the proportion and/or the polarity of the polar solvent in the mixture of solvents is adapted, under the subcritical conditions of the solvent or of the mixture of solvents used, so as to extract a fraction of light deasphalted oil predominantly comprising the family of the saturated hydrocarbons and the family of the aromatic hydrocarbons.

At least a part of the fraction of light deasphalted oil referred to as light DAO is advantageously sent to the post-treatment units such as a unit for hydrotreating and/or for hydrocracking, or for catalytic cracking.

The effluent comprising a heavy deasphalted oil phase referred to as heavy DAO and an asphalt phase extracted from the first stage of deasphalting can contain, at least in part, the apolar solvent or the mixture of solvents according to the invention. Advantageously according to the invention, said effluent is subjected to at least one stage of separation in which it is separated from the apolar solvent or from the mixture of solvents according to the invention, or at least one stage of separation in which said effluent is separated only from the apolar solvent contained in the mixture of solvents.

In a variant of the process according to the invention, said effluent can be subjected to at least two successive stages of separation making it possible to separate the solvents individually in each stage of separation (as described in the first embodiment of the invention).

The stages of separation are carried out under supercritical or subcritical conditions.

At the end of the stage of separation, the effluent comprising the heavy deasphalted oil phase referred to as heavy DAO and the asphalt phase separated from the solvent or mixture of solvents according to the invention can be sent into at least one stripping column before being sent to the second stage of deasphalting.

The mixture of polar and apolar solvents or the individually separated solvents are advantageously recycled. In a variant of the process only the apolar solvent is recycled into its respective makeup tank. When the recycled solvents are in a mixture, the proportion of the apolar and polar solvents is verified on-line and adjusted as needed via makeup tanks containing said polar and apolar solvents individually. When the solvents are separated individually, said solvents are individually recycled into said respective makeup tanks.

The second stage of deasphalting is implemented on the effluent comprising a heavy deasphalted oil phase referred to as heavy DAO and an asphalt phase originating from the first stage of deasphalting in the presence of a mixture of at least one polar solvent and at least one apolar solvent under the subcritical conditions for the mixture of solvents used. The polarity of said mixture of solvents is preferably higher than that of the solvent or mixture of solvents used in the first stage of deasphalting. This extraction is carried out so as to selectively extract from the effluent, an fraction of asphalt referred to as final, enriched with impurities and compounds resistant to upcycling, whilst leaving solubilized in the heavy deasphalted oil matrix referred to as heavy DAO, all or part of the polar structures of the least polar resins and asphaltenes remaining generally contained in the fraction of asphalt in the case of conventional deasphalting. At least a part of said heavy deasphalted oil referred to as heavy DAO having a highly aromatic nature is sent upstream of the stage a) of hydroconversion and/or to the inlet of the stage b) of separation.

Stage d) Recycling of the Heavy Deasphalted Oil Cut Referred to as Heavy DAO

According to the process of the invention, at least a part of said heavy deasphalted oil cut referred to as heavy DAO originating from stage c) is recycled upstream of the stage a) of hydroconversion and/or to the inlet of the stage b) of separation.

The part of the heavy deasphalted oil cut referred to as heavy DAO not recycled upstream of the stage a) of hydroconversion and/or to the inlet of the stage b) of separation can advantageously be sent, optionally mixed with at least a part and preferably all of the light liquid fraction originating from stage b), to post-treatment units such as for example a hydrotreating and/or hydrocracking, or catalytic cracking unit and/or with at least a part of the light deasphalted oil referred to as light DAO originating from stage c) to post-treatment units.

DESCRIPTION OF THE FIGURES

Figure 1:
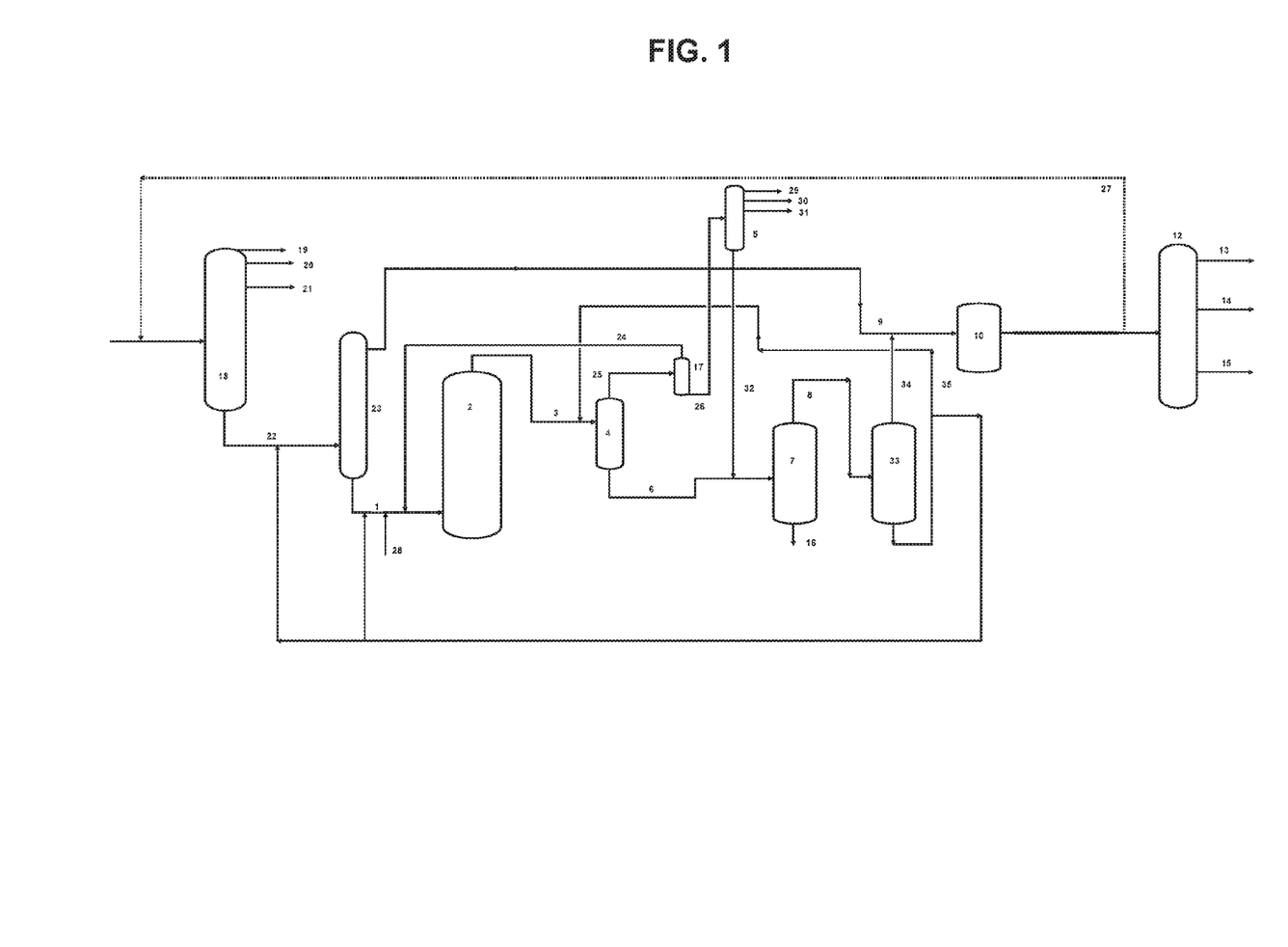
FIG. 1 shows an overall diagram of all of the stages of the process according to the invention.

FIG. 1 represents the overall diagram of all of the stages of the process of the invention according to the first embodiment. The feedstock originating from a vacuum distillation column (23) and having an initial boiling point of at least 300° C. is sent via the conduit (1) to an ebullating-bed hydroconversion unit (2).

The effluent obtained at the end of the stage of hydroconversion (leaving via the conduit 3) is separated in the separating zone (4) by steam stripping and/or hydrogen stripping or by vacuum fractionation. In the separating zone (4), the conditions are generally selected so that the cut point is 300° C., preferably 350° C. and more preferably 375° C., so as to obtain two liquid fractions, a so-called light fraction (conduit 25), and a so-called heavy fraction (conduit 6), without an intermediate stage of atmospheric and vacuum distillation.

The light liquid fraction is advantageously sent via the conduit 25 to a flask separator (17) in order to separate from it a fraction rich in hydrogen (conduit 24) and a light liquid fraction (conduit 26). Said liquid fraction is advantageously sent to a dedicated atmospheric column (5) in order to separate from it a gasoline fraction (29), a kerosene fraction (30), and a gas oil fraction (31). The hydrogen-rich fraction (conduit 24) is advantageously recycled to the inlet of the hydroconversion unit (2).

The distillation columns (5), (18) and (23) make it possible to separate the following fractions: gas, gasoline (19), kerosene (20), gas oil (21), vacuum distillate (9) (or VGO); and vacuum residue (1) (or VR).

The heavy liquid fraction is then sent via the conduit (6) to a unit for selective deasphalting in two stages (7 and 33) according to the invention in order to obtain a light deasphalted oil cut referred to as light DAO (conduit 34), a heavy deasphalted oil cut referred to as heavy DAO (conduit 35) and residual asphalt (conduit 16).

The heavy deasphalted oil cut referred to as heavy DAO is advantageously recycled at least partly, preferably completely, to the vacuum distillation column (23) or to the inlet of the separating zone (4) or to the inlet of the hydroconversion zone (2).

The light deasphalted oil referred to as light DAO is sent to post-treatment units (10), namely a hydrocracking unit with a view to maximizing the middle distillate cut and/or to a catalytic cracking unit with or without pre-treatment with a view to maximizing the gasoline cut.

The light deasphalted oil referred to as light DAO can be combined with the flow (9) that contains the vacuum distillate fraction (VGO) originating from column (23) optionally with a part of the heavy deasphalted oil DAO in the case where the latter is recycled upstream of this same column (23). The entire flow thus obtained is subjected to the same sequence of post-treatment as the light deasphalted oil referred to as light DAO.

The effluent originating from the hydrocracking or catalytic cracking unit is advantageously sent to an atmospheric distillation column of the post-treatment section (12) so as to recover the different upcyclable cuts. The gasoline cut is recovered via the conduit (13), the middle distillate cut via the conduit (14) and a heavier fraction of hydroconverted feedstock via the conduit (15). The effluent originating from the hydrocracking or catalytic cracking unit can also be recycled at least partly via the conduit 27 to the atmospheric distillation column at inlet (18).

The flow (28) allows optional injection of a catalytic precursor. This catalytic precursor can be sent either with the feedstock of the ebullating bed before the first reactor, or to the inter-stage separator between two reactors, or to the inlet of one of the other reactors. The catalytic precursor can also be injected in a differentiated manner at these various points of the reaction section in order to optimize its efficacy and its consumption connected with the operating conditions of the medium in which it is utilized and in particular the thermal level of the reactors.

Figure 2:
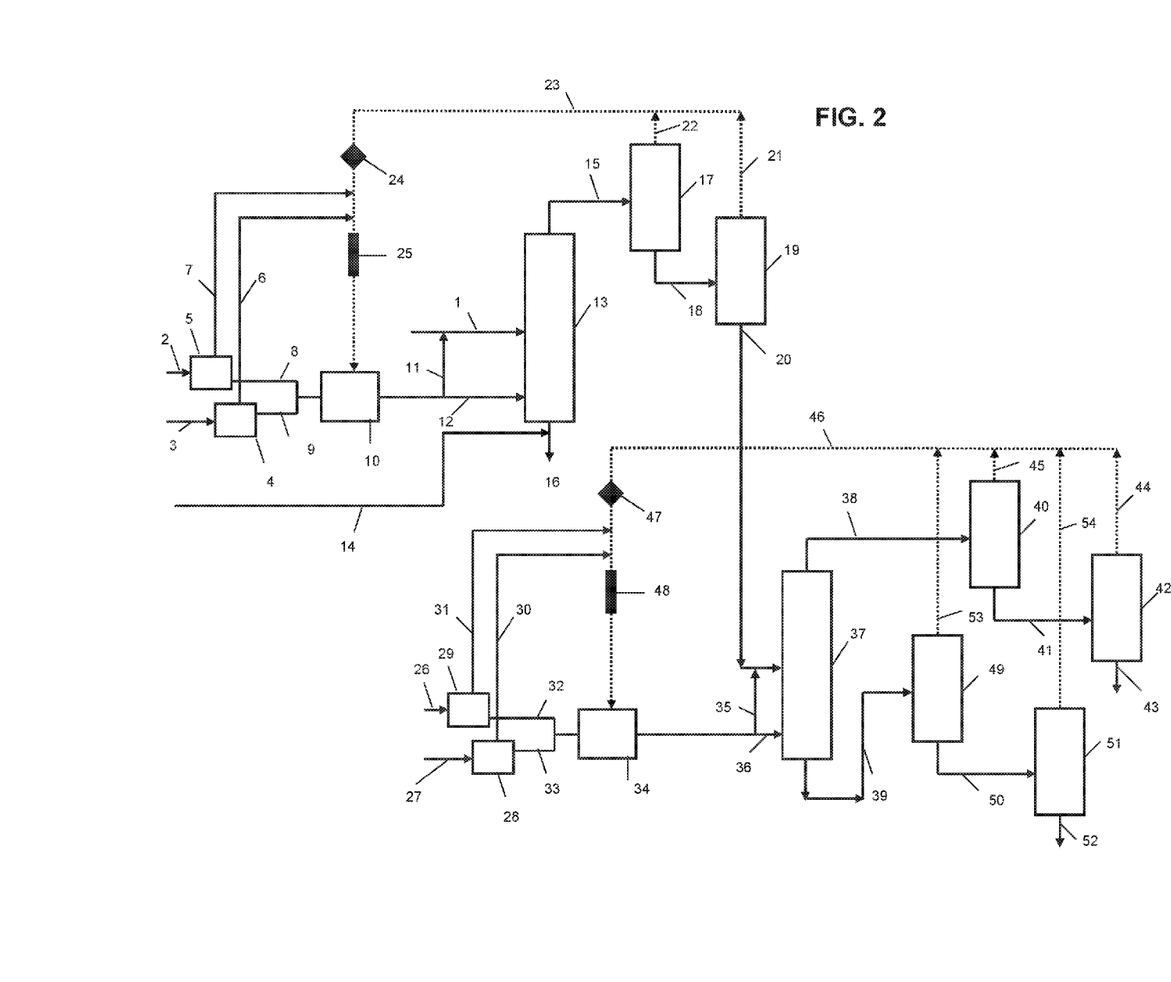
FIG. 2 shows a part of the overall diagram described in FIG. 1, in particular a first embodiment of the two-stage selective deasphalting.

FIG. 2 shows a part of the overall diagram shown in FIG. 1, in particular a first embodiment of selective deasphalting in two stages. The heavy liquid fraction originating from steam stripping or hydrogen stripping or from vacuum fractionation at the outlet of the hydroconversion unit goes via the conduit (1) into the first extractor (13) such as an extraction column, preferably a mixer-settler. The mixing of polar solvent (3) and apolar solvent (2) is carried out upstream in a mixer (10) fed by two makeup tanks each filled separately with polar solvent (tank 4) and apolar solvent (tank 5). The mixture of solvents is preferably introduced at the bottom of the extractor (13) via the conduit 12. A part of the mixture of solvents can also be sent via the conduit 11 in a mixture with the feedstock fed into the extractor (13) via the conduit 1.

At the end of the stage of extraction, the complete deasphalted oil referred to as extracted complete DAO, in a mixture with, at least in part, the mixture of solvents according to the invention, is sent via the conduit 15 to a separator (17), in which the complete deasphalted oil referred to as complete DAO is separated from the solvent according to the invention. Said mixture is advantageously separated in the separator under the supercritical or subcritical conditions. The complete deasphalted oil referred to as complete DAO is then preferably sent to a stripping unit or column (19) via the conduit 18, before being recovered via the conduit 20.

The solvent (22) originating from the separator (17) is combined with the solvent (21) originating from the stripper (19) and advantageously recycled internally to the extraction process via the line (23). The composition of the mixture of polar and apolar solvents is preferably verified on-line by a density meter or a refractometer (24). The proportions of polar solvent and apolar solvent are, as needed, readjusted with a makeup of polar solvent and apolar solvent respectively conveyed from the makeup tanks 4 and 5 via the conduits 6 and 7. The mixture readjusted in this way is advantageously homogenized in a static-type mixer (25) before being sent to the mixer (10).

According to FIG. 2, the asphalt (16) also containing the mixture of solvents according to the invention is drawn off from the extractor (13) in the form of a liquid mixture or in the form of a dispersed solid using a fluxing agent sent via the conduit 14. The mixture of asphalt, solvent according to the invention and fluxing agent is then sent via the conduit 16 to a stage of additional separation (not shown).

The extraction of the asphalt can be carried out in various ways. In one variant, the asphalt can be extracted in a batch process in solid form via two flasks in parallel as in the system for recovery of coke (delayed coker). The asphalt can thus be accumulated alternately in the flasks and recovered mechanically by opening the vessels. In another variant, the asphalt is solidified by flocculation in water; the asphalt collected is thus ready for transport and/or storage.

In another variant, the asphalt is drawn off from the extractor in slurry mode. The solid asphalt is then carried by a fluid different from the solvent and the fluxing agent. The asphalt is separated from said fluid by filtration. Advantageously, at least one fluid is used, which develops solvent power for the asphalt under supercritical conditions. The asphalt and the fluid are then separated advantageously by applying subcritical or supercritical conditions.

In another variant, the asphalt is extracted mixed with at least a part of the mixture of solvents with or without addition of fluxing agent. The mixture of solvents is advantageously separated from the asphalt, fluxed or not. The asphalt, fluxed or not, is then upcycled.

The second stage of selective deasphalting consists of sending the complete deasphalted oil referred to as complete DAO to a second extractor 37 such as an extraction column, preferably a mixer-settler. The mixing of polar solvent (27) and apolar solvent (26) is carried out upstream in a mixer (34) fed by two makeup tanks, each filled separately with polar solvent (tank 28) and apolar solvent (tank 29). The mixture of solvents is preferably introduced at the bottom of the extractor (37) via the conduit 36.

At the end of the second stage of extraction, the light deasphalted oil referred to as extracted light DAO, in a mixture with, at least in part, the mixture of solvents according to the invention, is sent via the conduit 38 to a separator (40) in which the light deasphalted oil DAO is separated from the solvent according to the invention.

Said mixture is advantageously separated in the separator under the supercritical or subcritical conditions. The light deasphalted oil referred to as light DAO is then preferably sent to a stripping unit or column (42) via the conduit 41, before being recovered via the conduit 43. The solvent originating from the stripper is sent to the line 46 via the conduit 44.

According to FIG. 2, the heavy deasphalted oil referred to as heavy DAO also containing the mixture of solvents according to the invention is drawn off from the extractor (37) in the form of a liquid mixture. The mixture of heavy deasphalted oil referred to as heavy DAO and solvent according to the invention is then sent via the conduit 39 to a and then a stripping column (51) in which the heavy deasphalted oil referred to as heavy DAO and the solvent are separated according to the invention. The heavy deasphalted oil referred to as heavy DAO is recovered via the conduit 52 and the mixture of solvents according to the invention is sent to the line 46 via the conduits 53 and 54.

The solvent originating from the separators (40,49) and from the strippers (42,51) is advantageously recycled internally to the extraction process via the line (46). The composition of the mixture of polar and apolar solvents is preferably verified on-line by a density meter or a refractometer (47). The proportions of polar solvent and apolar solvent are, as needed, readjusted with a makeup of polar solvent and apolar solvent respectively conveyed from the makeup tanks 28 and 29 via the conduits 30 and 31. The mixture readjusted in this way is advantageously homogenized in a static-type mixer (48) before being sent to the mixer (34).

Figure 3:
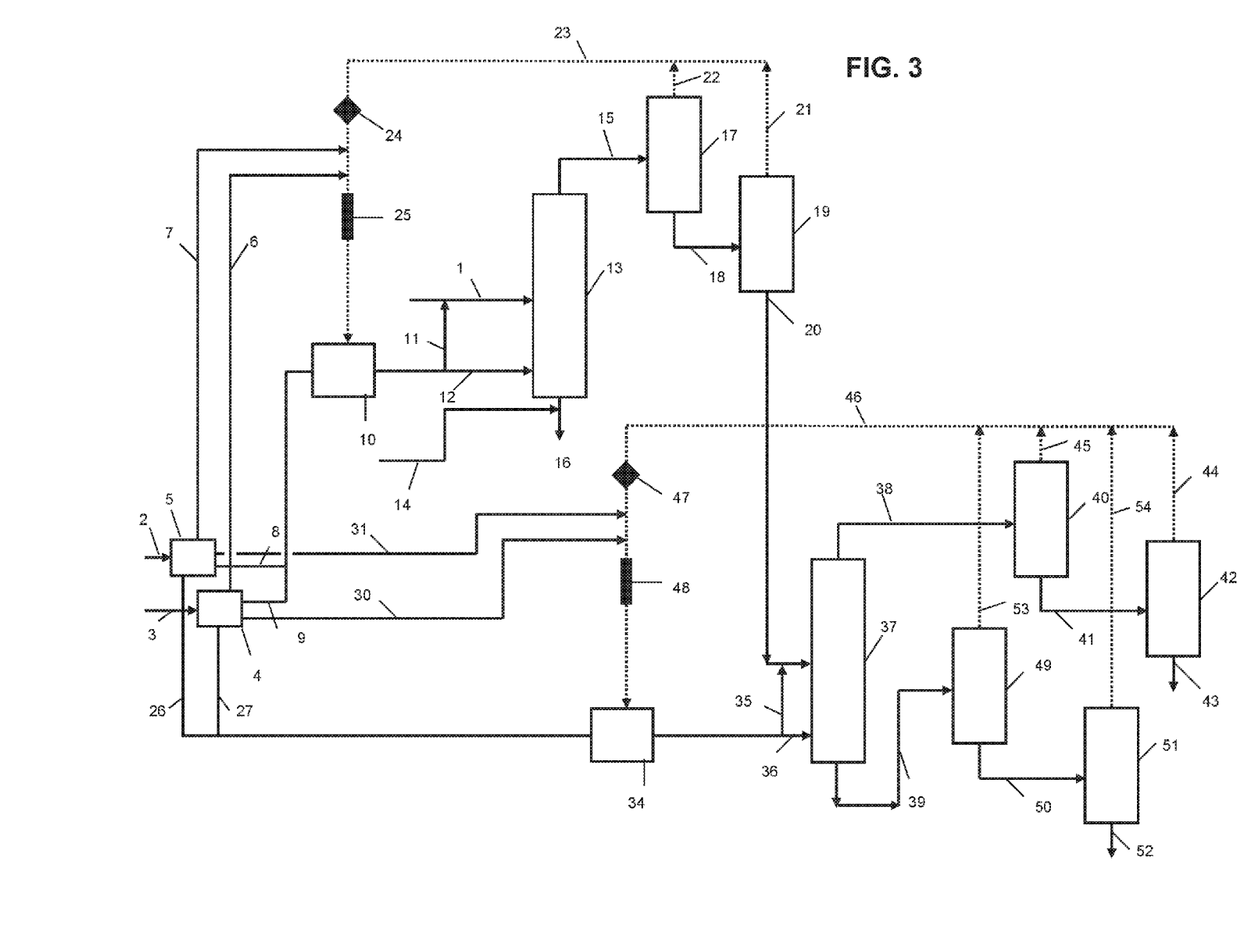
FIG. 3 shows a particular embodiment of FIG. 2 utilizing a single source of solvents.

FIG. 3 describes an embodiment identical to that described in FIG. 2, except that the embodiment described in FIG. 3 utilizes a single source of apolar and polar solvents for the two extractors, represented here by the makeup tanks 4 and 5, which feed the mixers (10, 34) via the conduits 8 and 9; and/or serve for readjusting the proportions of polar and apolar solvent in the recycled mixture of solvents (23 and 46) via the conduits 6 and 27 to the makeup tank 4 for polar solvent, and via the conduits 7 and 26 to the makeup tank 5 for apolar solvent.

The proportions of apolar solvent and polar solvent are adapted to the separation desired for each of the stages.

Example 1 (Comparative)

A residue (AR) resulting from the atmospheric distillation of an Athabasca crude is distilled under vacuum under conditions making it possible to obtain a vacuum residue (VR), the main characteristics of which are presented in Table 1 below. The feedstock of the ebullating bed is therefore a vacuum residue (VR) from extra-heavy crude the properties of which are as follows:

TABLE 1

Composition of the feedstock of the ebullating-bed hydroconversion unit

|  |  | Athabasca VR |
|---|---|---|
| Density |  | 1.048 |
| Viscosity at 100° C. | cSt | 12600 |
| Conradson Carbon | wt % | 20.5 |
| C7 Asphaltenes | wt % | 14 |
| C5 Asphaltenes | wt % | 25 |
| Nickel + Vanadium | ppm | 432 |
| Nitrogen | ppm | 6200 |
| Sulphur | wt % | 5.72 |

(wt % = percentage by weight);
(ppm = parts per million)

The feedstock obtained is sent in its entirety to a hydroconversion unit in the presence of hydrogen, said section comprising at least one three-phase reactor containing an NiMo/alumina hydroconversion catalyst. The section operates as an ebullating bed with ascending flow of liquid and of gas. The unit used comprises two reactors in series and is equipped with an inter-stage separator. The conditions applied in the hydroconversion unit are as follows:

Hourly space velocity of the reactor $(HSV)_{reactor}=0.3\ h^{-1}$
Total pressure $(P_{tot})=16$ MPa
Temperature $(T°)=410°$ C.
Quantity of hydrogen mixed with the feedstock in the first reactor=630 $Nm^3/m^3$
Quantity of hydrogen mixed with the feedstock in the second reactor=190 $Nm^3/m^3$ These operating conditions make it possible to obtain a liquid effluent with a reduced content of Conradson carbon, metals and sulphur. The hydroconverted liquid effluent is then sent to a separating zone consisting of two flash drums in series in order to obtain a light liquid fraction with a boiling point lower than 375° C. and a heavy liquid fraction with a boiling point greater than 375° C.

The heavy fraction with a boiling point greater than 375° C. contains a part of the gas oil fraction boiling between 250 and 375° C., a fraction boiling between 375 and 524° C. called vacuum distillate (VD) and a fraction with a boiling point greater than 524° C. called atmospheric residue (AR). The composition of the heavy fraction with a boiling point greater than 375° C. is shown in Table 2 below.

TABLE 2

Composition of the heavy fraction with boiling point greater than 375° C.

|  |  | Heavy fraction (375° C.+) |
|---|---|---|
| Yield | wt % | 63.1 |
| Density |  | 0.996 |
| Viscosity at 100° C. | cSt | 91.3 |
| Conradson Carbon | wt % | 9.4 |
| C7 Asphaltenes | wt % | 3.3 |
| Nickel + Vanadium | ppm | 62 |
| Nitrogen | ppm | 5900 |
| Sulphur | wt % | 1.06 |

(wt % = percentage by weight);
(ppm = parts per million)

The entire heavy liquid fraction with a boiling point greater than 375° C. originating from the stage of separation, without an intermediate stage of atmospheric and vacuum distillation, is deasphalted in order to obtain a deasphalted hydrocarbon cut and residual asphalt. The conditions applied in the deasphalting unit are as follows:

Solvent: C3/toluene=35/65 v/v (volume/volume)
Total pressure $(P_{tot})=4$ MPa
Average temperature $(T°_{ave})=130°$ C.
Solvent/feedstock volume ratio=5/1 v/w (volume/weight)

At the selective deasphalting outlet, a cut of deasphalted oil (DAO) and an asphalt are obtained. The cut of deasphalted oil (DAO) and the asphalt have the following characteristics shown in Table 3:

TABLE 3

Composition of the cut of deasphalted oil DAO and asphalt

|  |  | DAO | Asphalt |
|---|---|---|---|
| Yield | wt % | 95 | 5 |
| Density |  | 0.986 | 1.23 |

TABLE 3-continued

Composition of the cut of deasphalted oil DAO and asphalt

|  |  | DAO | Asphalt |
|---|---|---|---|
| Ball & Ring | ° C. | — | 310 |
| Viscosity at 250° C. | cSt | — | Not measurable |
| Viscosity at 100° C. | cSt | 40 | Not measurable |
| Conradson Carbon | wt % | 8.0 | 37.0 |
| C7 Asphaltenes | wt % | 0.7 | — |
| Nickel + Vanadium | ppm | 43 | 428 |
| Nitrogen | ppm | 5600 | 12200 |
| Sulphur | wt % | 1.00 | 2.09 |
| H/C |  | 1.45 | — |

(wt % = percentage by weight);
(ppm = parts per million)

The process therefore makes it possible to isolate a deasphalted oil cut with an overall yield of 59.9% by weight relative to the starting Athabasca vacuum residue. The deasphalted oil DAO obtained at the end of the selective deasphalting according to the invention can, due to its aromatic nature, be recycled ideally to the ebullating bed in order to have a stabilizing effect on the medium treated, by solubilizing and/or peptizing and/or dispersing the molecular structures that are favourable to the formation of sediments. All of the deasphalted oil DAO recycled is completely converted to 540− fraction. An overall conversion of the 540+ fraction of 96.8% by weight is obtained.

Example 2 (According to the Invention)

The feedstock for selective deasphalting in 2 stages according to the invention is the same as that presented in Table 2 of Example 1. The conditions applied in the selective deasphalting unit are as follows:
First Stage of Deasphalting:
Solvent: C3/toluene=35/65 v/v (volume/volume)
Total pressure $(P_{tot})$=4 MPa
Average temperature $(T°_{ave})$=130° C.
Solvent/feedstock ratio=5/1 v/w (volume/weight)
Second Stage of Deasphalting:
Solvent: C3/toluene=99/1 v/v (volume/volume)
Total pressure $(P_{tot})$=4 MPa
Average temperature $(T°_{ave})$=120° C.
Solvent/feedstock ratio=5/1 v/w (volume/weight)

At the outlet of the first stage of selective deasphalting, a deasphalted oil cut (DAO or complete DAO) and an asphalt are obtained. At the outlet of the second stage of selective deasphalting, a heavy deasphalted oil cut (heavy DAO) and a light deasphalted oil cut (light DAO) are obtained. The deasphalted oil cuts (DAO, heavy DAO, light DAO) and the asphalt have the following characteristics shown in Table 4:

TABLE 4

Composition of the deasphalted oil cuts (DAO, heavy DAO, light DAO) and of the asphalt

|  |  | 1st stage | | 2nd stage | |
|---|---|---|---|---|---|
|  |  | DAO | Asphalt | Heavy DAO | Light DAO |
| Yield | wt % feedstock at inlet | 95 | 5 | 57 | 38 |
| Density |  | 0.986 | 1.230 | 1.021 | 0.933 |
| Ball & Ring | ° C. | — | 310 | — | — |
| Viscosity at 100° C. | cSt | 40 | NM | 56 | 25 |
| Conradson Carbon | wt % | 8.0 | 37.0 | 13.0 | 0.2 |
| C7 Asphaltenes | wt % | 0.7 | — | 1.1 | 0.01 |
| Nickel + Vanadium | ppm | 43 | 428 | 71 | 1 |
| Nitrogen | ppm | 5600 | 12200 | 8713 | 930 |
| Sulphur | wt % | 1.00 | 2.09 | 1.47 | 0.30 |
| H/C |  | 1.45 | — | 1.28 | 2.11 |

(wt % = percentage by weight);
(ppm = parts per million);
(NM = not measurable)

The process according to the invention therefore makes it possible to isolate, in a first stage, a deasphalted oil cut with an overall yield of 59.9% by weight relative to the starting Athabasca vacuum residue. Moreover, due to the introduction of a second stage of selective deasphalting, the deasphalted oil cut is subdivided into a heavy deasphalted oil cut and a light deasphalted oil cut. Due to the second stage, the advantage is therefore fractionation of the complete deasphalted oil fraction into two other different cuts that are of interest.

The heavy deasphalted oil referred to as heavy DAO obtained at the end of the second stage of selective deasphalting according to the invention, due to its more aromatic nature, can be recycled ideally to the ebullating bed in order to have a stabilizing effect on the medium being treated by solubilizing and/or peptizing and/or dispersing the molecular structures that are favourable to the formation of sediments.

The light deasphalted oil referred to as light DAO obtained at the end of the second stage of selective deasphalting according to the invention, thus partly depleted of the aromatic fraction and resin fraction, has a far less pronounced refractory nature, making it possible to lower the pressure conditions in the hydrotreating and/or hydrocracking post-treatment processes. This makes it possible to improve the profitability of post-treatment.

Compared to the sequence of an ebullating-bed hydroconversion unit with a selective deasphalting unit in one stage, the recycled heavy deasphalted oil referred to as heavy DAO has different properties: ratio of hydrogen to carbon (H/C) decreased by 0.17 points; the density, the CCR and the content of C7 asphaltenes increased respectively by 0.035 points, 5 points and 0.4 points. This more aromatic nature of the recycled heavy deasphalted oil DAO makes it possible to increase the temperature of the reactor or reactors of the ebullating bed by 3° C., thus improving the total conversion. This observed overall conversion of the 540+ fraction increases from 96.8% to 98.8% by weight.

The invention claimed is:
1. Process for the conversion of a heavy hydrocarbon feedstock having an initial boiling point of at least 300° C. comprising the following stages:
   a) a stage of hydroconverting at least a part of said feedstock in the presence of hydrogen in at least one three-phase reactor, said reactor containing at least one hydroconversion catalyst and operating as an ebullating bed, with ascending flow of liquid and of gas and comprising at least one means for drawing off said catalyst from said reactor and at least one means for supplying fresh catalyst to said reactor, under conditions to obtain a liquid feedstock with a reduced content of Conradson carbon, metals, sulphur and nitrogen;
b) a stage of separating the effluent originating from stage a) in order to obtain a light liquid fraction with a boiling point lower than 300° C. and a heavy liquid fraction with a boiling point greater than 300° C.;
c) at least two stages of deasphalting in series on at least a part of the heavy liquid fraction originating from stage b), making it possible to separate at least one fraction of asphalt, at least one fraction of heavy deasphalted oil, referred to as heavy DAO, and at least one fraction of light deasphalted oil, referred to as light DAO, at least one of said stages of deasphalting being carried out by means of a mixture of at least one polar solvent and at least one apolar solvent, the proportions of said polar solvent and said apolar solvent in the mixture of solvents being adjusted depending on the properties of the feedstock treated and depending on the desired yield of asphalt and/or quality of the deasphalted oil, said stages of deasphalting being implemented under the subcritical conditions of the mixture of solvents used; and
d) a stage of recycling at least a part of said heavy deasphalted oil cut referred to as heavy DAO originating from stage c) upstream of the stage a) of hydroconverting and/or to the inlet of the stage b) of separating.

2. Process according to claim 1, in which stage a) is implemented in one or more three-phase hydroconversion reactors with intermediate settler drums.

3. Process according to claim 1, in which stage c) is implemented on at least a part of the heavy fraction previously subjected to a stage of steam stripping and/or hydrogen stripping or to a stage of vacuum fractionation.

4. Process according to claim 1, in which the stage a) of hydroconverting is carried out under an absolute pressure comprised between 2 and 35 MPa, at a temperature comprised between 300 and 550° C., at a hourly space velocity (HSV) comprised between 0.1 $h^{-1}$ and 10 $h^{-1}$ and with a quantity of hydrogen mixed with the feedstock comprised between 50 and 5000 normal cubic meters ($Nm^3$) per cubic meter ($m^3$) of liquid feedstock.

5. Process according to claim 1, in which at least a part of the fraction of light deasphalted oil referred to as light DAO is sent to a post-treatment unit.

6. Process according to claim 1, in which at least a part of the heavy deasphalted oil cut referred to as heavy DAO not recycled upstream of the stage a) of hydroconverting and/or to the inlet of the stage b) of separating is sent to a post-treatment unit.

7. Process according to claim 1, in which the hydroconversion catalyst is a catalyst comprising an alumina support and at least one group VIII metal selected from nickel and cobalt, said group VIII element being used in combination with at least one group VIB metal selected from molybdenum and tungsten.

8. Process according to claim 1, in which stage c) comprises at least:
c1) a first stage of deasphalting comprising bringing the heavy liquid fraction into contact with a mixture of at least one polar solvent and at least one apolar solvent, the proportions of said polar solvent and of said apolar solvent being adjusted so as to obtain at least one fraction of asphalt phase and a fraction of complete deasphalted oil phase referred to as complete DAO; and
c2) a second stage of deasphalting comprising bringing the complete deasphalted oil phase referred to as complete DAO originating from stage c1) into contact with either an apolar solvent or a mixture of at least one polar solvent and at least one apolar solvent, the proportions of said polar solvent and of said apolar solvent in the mixture being adjusted so as to obtain at least one fraction of light deasphalted oil phase referred to as light DAO and a fraction of heavy deasphalted oil phase referred to as heavy DAO,
said stages of deasphalting being implemented under the subcritical conditions of the solvent or mixture of solvents used.

9. Process according to claim 8, in which the complete deasphalted oil referred to as complete DAO originating from stage c1) with, at least in part, the mixture of solvents is subjected to at least one stage of separation in which the complete deasphalted oil referred to as complete DAO is separated from the mixture of solvents or at least one stage of separation in which the complete deasphalted oil referred to as complete DAO is separated only from the apolar solvent.

10. Process according to claim 8, in which the complete deasphalted oil referred to as complete DAO originating from stage c1) with, at least in part, the mixture of solvents is subjected to at least two successive stages of separation allowing the solvents to be separated individually in each stage.

11. Process according to claim 1, in which stage c) comprises at least:
c'1) a first stage of deasphalting comprising bringing the heavy liquid fraction into contact with either an apolar solvent, or a mixture of at least one polar solvent and at least one apolar solvent, the proportions of said polar solvent and said apolar solvent in the mixture being adjusted so as to obtain at least one fraction of light deasphalted oil phase referred to as light DAO and an effluent comprising an oil phase and an asphalt phase; and
c'2) a second stage of deasphalting comprising bringing the effluent originating from stage c'1) into contact with a mixture of at least one polar solvent and at least one apolar solvent, the proportions of said polar solvent and of said apolar solvent being adjusted so as to obtain at least one fraction of asphalt phase and a fraction of heavy deasphalted oil phase referred to as heavy DAO,
said stages of deasphalting being implemented under the subcritical conditions of the solvent or mixture of solvents used.

12. Process according to claim 11, in which the effluent from stage c' 1) is subjected to at least one stage of separation, in which it is separated from the apolar solvent or mixture of solvents or at least one stage of separation, in which said effluent is separated only from the apolar solvent contained in the mixture of solvents.

13. Process according to claim 11, in which the effluent from stage c' 1) is subjected to at least two successive stages of separation making it to separate the solvents individually in each stage of separation.

14. Process according to claim 1, in which the polar solvent used in the stage c) of deasphalting is selected from pure aromatic or naphthene-aromatic solvents, the polar solvents comprising heteroelements, or a mixture thereof or cuts rich in aromatics.

15. Process according to claim 1, in which the apolar solvent used in the stage c) of deasphalting comprises a solvent made up of a saturated hydrocarbon comprising a number of carbon atoms greater than or equal to 2.

16. Process according to claim 1, in which stage c) is implemented with a ratio of the volume of the mixture of polar and apolar solvents to the mass of the feedstock comprised between 1/1 and 10/1 expressed as liters per kilogram.

17. Process according to claim 1, in which the feedstock is crude oil or a feedstock originating from atmospheric distillation or vacuum distillation of crude oil, or a residual fraction originating from the direct liquefaction of coal or a vacuum distillate or a residual fraction originating from the direct liquefaction of lignocellulosic biomass alone or in a mixture with coal and/or a fraction of residual petroleum.

18. Process according to claim 1, in which a catalytic precursor is injected either with the feedstock of the ebullating-bed hydroconversion unit, or at an inter-stage separator between two phases of the three-phase reactor, or at the inlet of the second or third phase of the three-phase reactor.

19. Process according to claim 5, in which the post-treatment unit is a hydrotreating, hydrocracking and/or catalytic cracking unit.

20. Process according to claim 6, in which the post-treatment unit is a hydrotreating, hydrocracking and/or catalytic cracking unit.

21. Process according to claim 6, in which the at least part of the heavy deasphalted oil cut referred to as heavy DAO not recycled upstream of the stage a) of hydroconverting and/or to the inlet of the stage b) of separating is sent, in a mixture with at least a part of the light liquid fraction originating from stage b) and/or at least a part of the light deasphalted oil referred to as light DAO originating from stage c), to a post-treatment unit.

22. Process according to claim 1, in which the polar solvent used in the stage c) of deasphalting is selected from cuts originating from FCC (Fluid Catalytic Cracking), cuts derived from coal, biomass or biomass/coal mixture.

23. Process according to claim 1, in which the apolar solvent used in the stage c) of deasphalting comprises a solvent made up of a saturated hydrocarbon with a number of carbon atoms between 2 and 9.

* * * * *